Patented Apr. 22, 1941

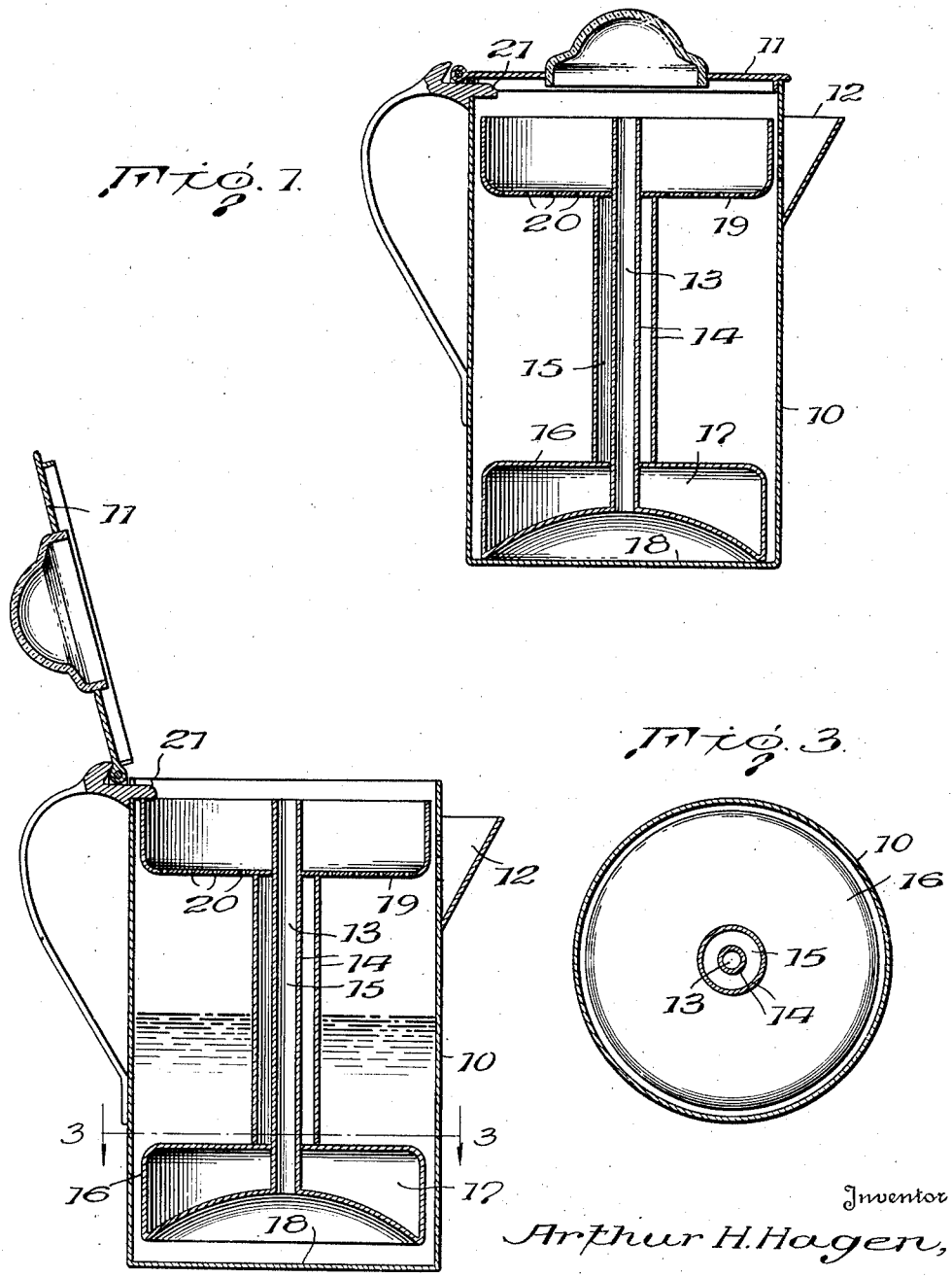

2,239,001

UNITED STATES PATENT OFFICE 2,239,001

COFFEE PERCOLATOR

Arthur H. Hagen, Globe, Ariz.

Application May 11, 1940, Serial No. 334,634

2 Claims. (Cl. 53—3)

This invention relates to improvements in coffee percolators.

The principal object of the invention is to provide a coffee percolator with which the quantity of ground coffee bean required for making a beverage of proper strength with any given amount of water can very easily be determined or measured out.

Another object of the invention is to provide a coffee percolator in which the buoyant effect of the water placed in the percolator is utilized in determining the quantity of ground coffee bean that should be used for the amount of water in the percolator.

More specifically, the invention contemplates a coffee percolator wherein the ground coffee bean is placed in a container provided with a depending stem which is normally adapted to seat or rest on the bottom of the coffee percolator, but the weight of this container and its stem is such that the stem will be buoyed up or raised from the bottom of the percolator by the water placed in the percolator. However, the weight of the container and stem is such that, when an amount of coffee bean necessary for making a beverage of the proper strength with the water in the percolator is placed in the container, the latter will again become lowered to a point where its stem will rest on the bottom of the coffee percolator. Thus, it is unnecessary to actually measure the amount of ground coffee bean that is placed in the container, as the sinking of the container and its stem in the water-filled or partially water-filled percolator will indicate when the necessary amount of ground bean has been deposited in the container.

Another object of the invention is to provide means in the percolator for limiting the upward movement of the container and its stem by the buoyant effect of the water so that the container will not interfere with the closing of the percolator top.

With these and other objects in view, the invention consists in certain details of construction and combinations and arrangements of parts, all as will hereinafter be more fully described and the novel features thereof particularly pointed out in the appended claims.

In the accompanying drawings—

Figure 1 is a vertical sectional view of a percolator embodying the present invention, with the container and its depending stem resting in their normal position with the latter seated on the bottom of the percolator; and Fig. 2 is a similar view, but showing the percolator with a quantity of water therein and the actual effect of the water on the container and its stem.

Fig. 3 is a sectional view on the line 3—3 of Fig. 2.

The body 10, the cover 11 and the pouring spout 12 of the percolator may be of any desired design, as the invention has to do more particularly with the construction of the container for the ground coffee bean and the stem portion on which said container is carried.

In the present invention, the stem 13 is of tubular formation and of double-walled construction, as indicated at 14, to form a longitudinally extending air space or chamber 15 and the base portion 16 of the stem also forms an air chamber 17 into which the elongated air chamber 15 merges. This base portion 16 is enlarged, preferably substantially covering the bottom 18 of the percolator and, as illustrated in Fig. 1, this base portion normally rests on the bottom of the percolator. Adjacent its upper end, the stem 13 carries the container 19 for the ground coffee bean, said container being formed with a multiplicity of perforations 20 so that water rising through the tubular stem 13 can seep through the ground coffee bean in the container and return through the perforations into the percolator proper, all as is well understood in the domestic making of coffee.

The buoyancy imparted to the stem 13 and its base 16 by the air chambers 15, 17, is such that, when water is placed in the percolator, the stem, together with the container 19, which is fixed to the stem, will rise, as shown in Fig. 2. However, this buoyancy of the assembled stem and container is such that, when an amount of ground coffee bean, necessary for making a beverage of the desired strength from whatever quantity of water has been placed in the percolator, is deposited in the container, the latter will sink or be lowered in the water until its base portion is seated on the percolator bottom. Thus, if, say three ordinary cups of water have been placed in the percolator, the container and stem will rise from the bottom of the percolator but, upon placing in the container an amount of ground coffee bean required for making a beverage of the desired strength from the three cups of water, the stem will again return to a point where its base will rest on the percolator bottom. The same result will be obtained, so far as determining the amount of coffee required to be placed in the container is concerned, regardless of the amount of water that has been placed in the percolator.

Of course, the greater the amount of water that is placed in the percolator, the higher the container will tend to rise and, in order that this upward movement of the container will not interfere with the closing of the lid or cover of the percolator, means are provided for limiting such upward movement. For instance, a lug or projection 21 may be provided at a suitable point near the top of the inner wall of the percolator. This lug 21 does not extend into the interior of the percolator a distance such as will interfere with placement of the container and its depending stem in the percolator. However, the length of the lug or projection is such that, after the container is positioned in the percolator, it will overhang, so to speak, the rim of the container whereby the upward movement of the container by the buoyant effect of the water is limited to a point slightly below the upper edge of the percolator. Thus, regardless of the amount of water that is placed in the percolator, the cover or lid 11 can always be properly seated around the edge of the percolator to close the latter.

With the present construction, it is unnecessary to actually measure out any quantity of ground coffee bean before placing it in the container. All that is necessary is to place in the percolator an amount of water which will produce the desired quantity of beverage and then pour or otherwise deposit in the container the ground coffee bean until the container, which will then be floating in the percolator, is caused to assume its normal position with its base seated on the bottom of the percolator. When the container assumes this position, the user will know that there has been placed in the container an amount of ground coffee bean that will produce a beverage of the desired strength from the water that has previously been placed in the percolator.

What I claim is:

1. In a coffee percolator, a perforated container for ground coffee, an extension depending from said container adapted to normally rest on the percolator bottom, the buoyancy of the container and extension being such that they will be raised off the bottom of the percolator by water deposited in the percolator but returned to their normal lowered position by the placement in the container of an amount of ground coffee required for making a beverage of the desired strength from the volume of water in the percolator, and means on the wall of the percolator for limiting the upward movement of the container caused by the buoyant effect of the water.

2. In a coffee percolator, a perforated container for ground coffee, an extension depending from said container, and a float on said extension, the buoyancy of the container, extension and float being such that they will be raised from the bottom of the percolator by water placed in the percolator in the absence of coffee in said container but depressed to the bottom of the percolator by the additional weight of a quantity of coffee required for the amount of water in the percolator.

ARTHUR H. HAGEN.